United States Patent
Gao et al.

(10) Patent No.: US 8,491,802 B1
(45) Date of Patent: Jul. 23, 2013

(54) METHOD OF FORMING A DIELECTRIC SLOPE FOR EAMR AND MAGNETIC WRITER

(75) Inventors: Wei Gao, Fremont, CA (US); Dujiang Wan, Fremont, CA (US); Zhihong Zhang, Fremont, CA (US); Lijun Tong, Danville, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 202 days.

(21) Appl. No.: 13/042,819

(22) Filed: Mar. 8, 2011

(51) Int. Cl.
*B29D 11/00* (2006.01)
*C03C 15/00* (2006.01)

(52) U.S. Cl.
USPC ............. 216/24; 216/89; 216/95; 438/692

(58) Field of Classification Search
USPC ............ 216/22, 24, 89, 95; 360/13, 59, 125, 360/8; 369/13; 29/603; 438/692
See application file for complete search history.

(56) References Cited

U.S. PATENT DOCUMENTS

| | | | |
|---|---|---|---|
| 4,667,395 A | 5/1987 | Ahlgren et al. | |
| 5,994,747 A | 11/1999 | Wu | |
| 6,746,877 B1 | 6/2004 | Hornik et al. | |
| 6,795,630 B2 | 9/2004 | Challener et al. | |
| 7,272,079 B2 | 9/2007 | Challener | |
| 7,500,255 B2 | 3/2009 | Seigler et al. | |
| 2003/0137772 A1 | 7/2003 | Challener | |
| 2008/0068748 A1 | 3/2008 | Olson et al. | |
| 2009/0073858 A1 | 3/2009 | Seigler et al. | |
| 2010/0104768 A1 | 4/2010 | Xiao et al. | |
| 2010/0123965 A1 | 5/2010 | Lee et al. | |
| 2010/0123967 A1 | 5/2010 | Batra et al. | |
| 2011/0303637 A1* | 12/2011 | Araki et al. | ............. 216/24 |

* cited by examiner

*Primary Examiner* — Nadine Norton
*Assistant Examiner* — Mahmoud Dahimene

(57) ABSTRACT

A method of forming an energy assisted magnetic recording (EAMR) writer is disclosed. A structure comprising a bottom cladding layer and a near field transducer (NFT) is provided. A patterned sacrificial layer is formed over the structure. A top cladding layer is deposited over the patterned sacrificial layer and a remaining region of the structure not covered by the patterned sacrificial layer. A patterned resist is formed over the top cladding layer. A first etching operation is performed on the top cladding layer via the patterned resist, whereby a top cladding having a sloped region is formed. The patterned sacrificial layer provides an etch stop for the first etching operation.

19 Claims, 8 Drawing Sheets

METHOD OF FORMING A DIELECTRIC SLOPE FOR EAMR AND MAGNETIC WRITER

FIELD OF THE INVENTION

The present invention generally relates to magnetic recording and, in particular, relates to method of forming dielectric slope for EAMR and magnetic writer.

BACKGROUND

With current perpendicular magnetic recording technology, the magnetic recording areal density has been pushed to around 500~600 Gb/in$^2$, and has almost reached the physical upper limit imposed by the superparamagnetic effect. Even with the availability of a higher coercivity magnetic material such as FePt and CoPd, a poor writability resulting from saturation of the writing head is expected to become a bottle neck. Energy Assisted Magnetic Recording (EAMR) or Heat Assisted Magnetic Recording (HAMR) technology has become the common pursuit in data storage circle, since the technology offers a way to circumvent the writability bottleneck and further push the data areal density to 1 Tbit/in$^2$ and beyond. The EAMR/HAMR technology can eventually merge with the patterned media.

Near Field Transducer (NFT) is a critical element for an EAMR or HAMR head to transfer enough energy to a tiny bit region and heat the region up to a temperature close to the Currier Temperature temporarily so as to achieve the writability within the short duration. FIG. 1 is a diagram depicting an NFT 102 disposed adjacent to a magnetic pole 104 and having a sloped top cladding 106 comprised of a dielectric material (e.g., an aluminum oxide).

A traditional approach to form such a top cladding having a sloped region (hereinafter referred to as "dielectric slope") is by a milling or RIE operation which requires a buffer or metal etch stop layer. Typically, such a buffer or metal etch stop layer remains under the dielectric slope after the etching operation. For some optical applications, such as in an EAMR writer, only an optically transparent dielectric material can be used for the buffer or metal etch stop layer, thereby severely limiting the choice of metals and buffer materials that can be used for this purpose.

BRIEF SUMMARY OF THE INVENTION

The present disclosure addresses this and other problems by providing various methods of forming a dielectric slope by the use of a sacrificial metal etch stop layer. In certain aspects, the use of a sacrificial metal etch stop layer enables formation of a dielectric slope having a slope angle in the range of 30 and 60 degrees and a thickness of up to 1 micron from AlO$_x$ or other RIE-etchable dielectric materials. In some aspects, the sacrificial metal etch stop layer can be subsequently removed by an isotropic wet etch, and a resulting undercut can be refilled by an atomic layer deposition process (e.g., AlOx ALD).

In certain aspects, methods of forming an energy assisted magnetic recording (EAMR) writer are provided. The methods comprise providing a structure comprising a bottom cladding layer and a near field transducer (NFT). The methods can further comprise forming a patterned sacrificial layer over the structure. The methods can further comprise depositing a top cladding layer over the patterned sacrificial layer and a remaining region of the structure not covered by the patterned sacrificial layer. The methods can further comprise forming a patterned resist over the top cladding layer. The methods can further comprise performing a first etching operation on the top cladding layer via the patterned resist, whereby a top cladding having a sloped region is formed. The patterned sacrificial layer provides an etch stop for the first etching operation.

DETAILED DESCRIPTION

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention.

Figure 1:
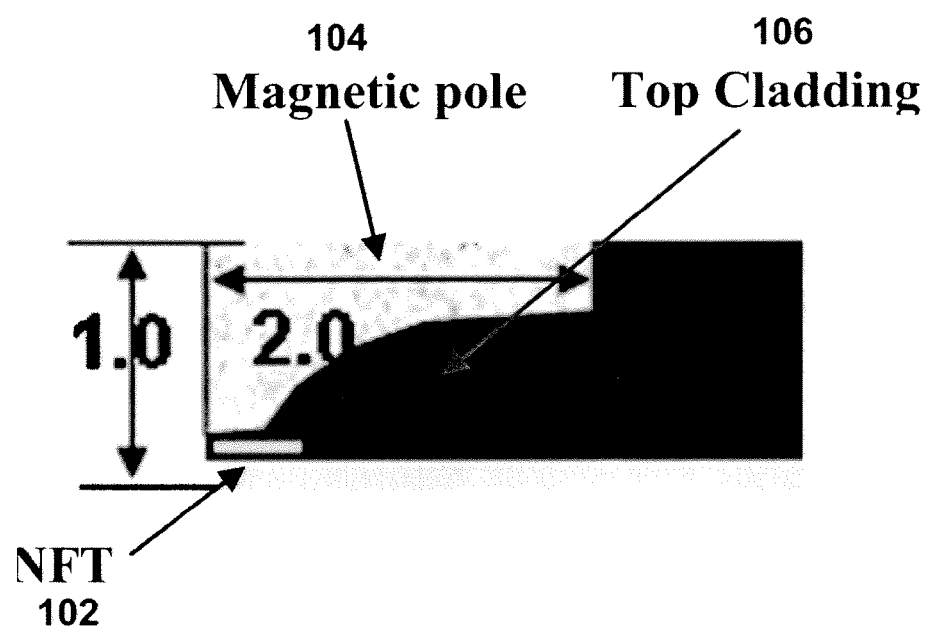
FIG. 1 is a diagram depicting an NFT structure having a sloped top cladding.
Figure 2A:
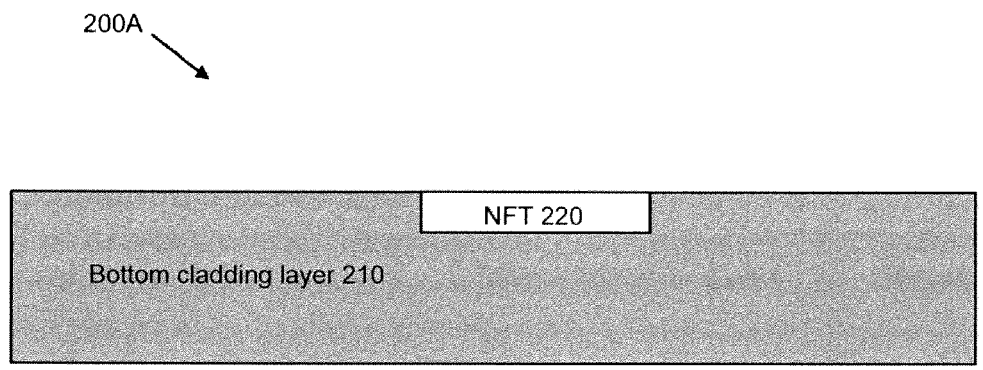
FIGS. 2A-I represent a sequence of diagrams illustrating an exemplary fabrication process for an NFT structure with a dielectric slope such as the one depicted of FIG. 1 according to certain aspects of the present disclosure.

FIGS. 2A-H represent a sequence of diagrams illustrating an exemplary fabrication process for an NFT structure with a dielectric slope such as the one depicted of FIG. 1 according to certain aspects of the present disclosure. FIG. 2A is a diagram depicting a structure 200A comprising a bottom cladding layer 210 and an NFT 220. The bottom cladding layer 210 is comprised of a dielectric material such as aluminum oxide (AlOx), silicon dioxide (SiO$_2$), gallium nitride (GaN), and silicon oxi-nitride (SiON). In the illustrated example, the NFT 220 is disposed in a groove formed in the bottom cladding layer 210, and a top surface of the NFT 220 is coplanar with the top surface of the bottom cladding layer 210.

Figure 2B:
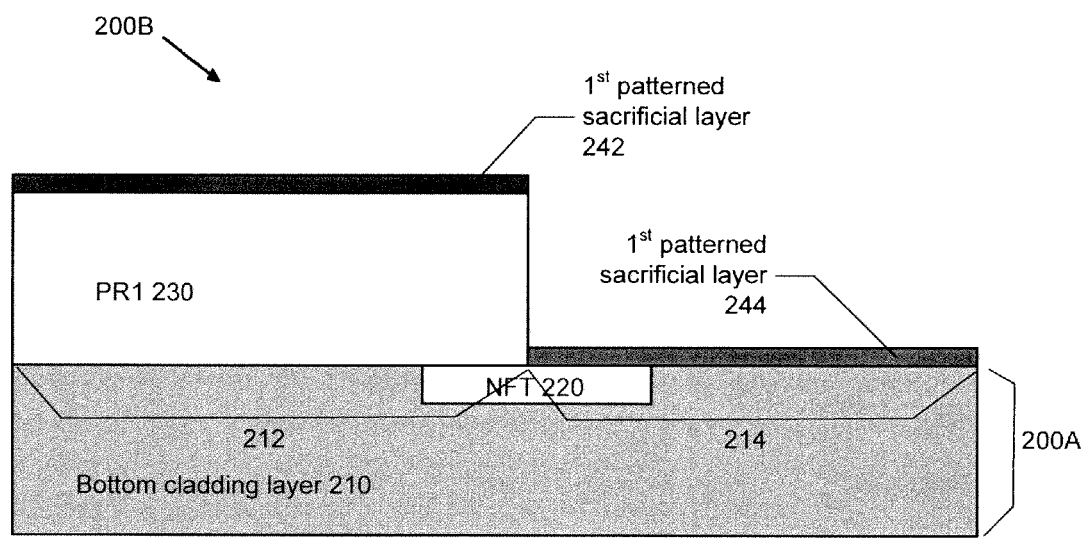

FIG. 2B is a diagram illustrating a step for forming an intermediate structure 200B having a set of patterned sacrificial layers 242, 244 over the structure 200A of FIG. 2A. This step includes but is not limited to: forming a first patterned photoresist (PR1) 230 on a first region 212 of the structure 200A and depositing a set of first patterned sacrificial layers 242, 244 on the PR1 230 and a second region 214 of the structure 200A, respectively. The set of first patterned sacrificial layers 242, 244 have a thickness in the range of about 10 and 40 nm and are comprised of a sacrificial material that can act as an etch stop layer in a first RIE etching operation to be described below. In certain embodiments, the sacrificial material includes a metal selected from the group consisting of Cr, NeFe, and Ru. The metal sacrificial material can be deposited using a known deposition process such as a sputter deposition.

Figure 2C:
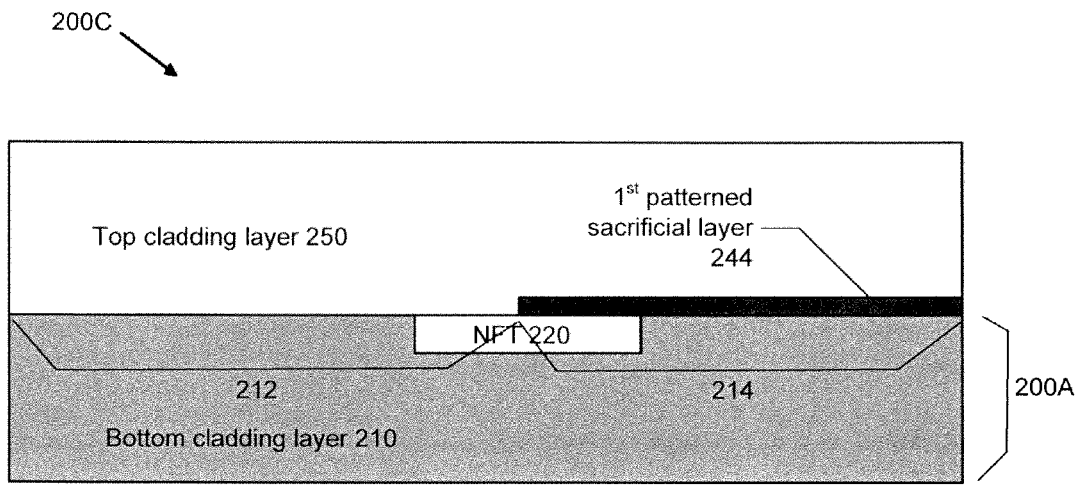

FIG. 2C is a diagram illustrating a step for forming an intermediate structure 200C having a top cladding layer 250. This step includes but is not limited to: removing the PR1 230 and the first patterned sacrificial layer 242 deposited thereon by a lift-off process and depositing a dielectric material comprising the top cladding layer 250 on the exposed first region 212 of the structure 200A and the remaining first patterned sacrificial layer 244. In certain embodiments, the dielectric material comprising the top cladding layer 250 is the same as the dielectric material comprising the bottom cladding layer 210. In other embodiments, the dielectric material comprising the top cladding layer 250 is different from the dielectric material comprising the bottom cladding layer 210. The dielectric material comprising the top cladding layer 250 is typically deposited using any suitable deposition process such as ion beam deposition, sputter deposition, or chemical vapor deposition.

Figure 2D:
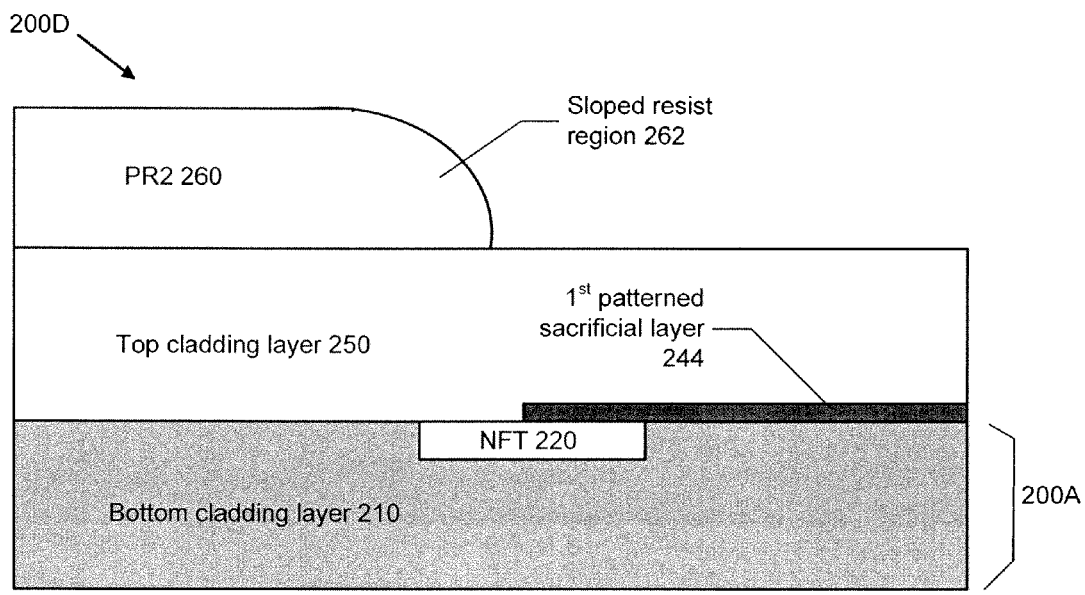

FIG. 2D is a diagram illustrating a step for forming an intermediate structure 200D having a second patterned photoresist (PR2) 260 over the top cladding layer 250. This step includes but is not limited to: depositing a photoresist layer over the top cladding layer 250; patterning the photoresist layer to obtain a patterned photoresist having a relatively sharp edge (not shown); and reflowing the patterned photoresist at an elevated temperature (e.g., slightly below the glass transition temperature of the photoresist material) for a specific duration to form a sloped resist region 262 in the PR2 260. As will be described below with respect to FIG. 2E, a profile (e.g., thickness and contour of the sloped resist region 262) of the PR2 260 determines a profile (e.g., thickness and slope angle) of a sloped region 254 of a patterned top cladding layer 252 to be formed via the PR2 260.

Figure 2E:
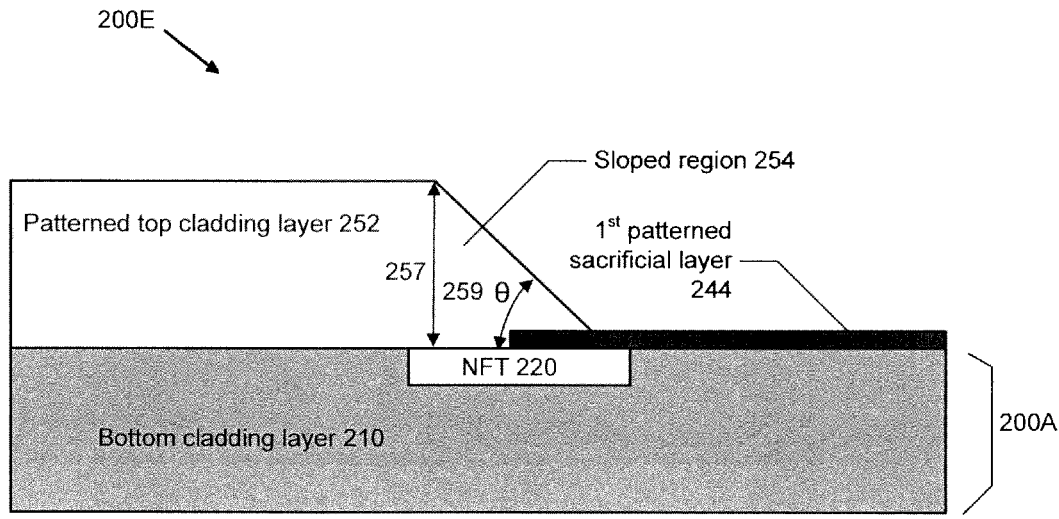

FIG. 2E is a diagram illustrating a step for forming an intermediate structure 200E having the patterned top cladding layer 252. The patterned top cladding layer 252 includes the sloped region 254 that has a thickness 257 and makes a slope angle θ 259 with respect to the top surface of the first patterned sacrificial layer 242. This step includes but is not limited to: performing a first RIE etching operation on the top cladding layer 250 of the structure 200D (FIG. 2D) via the PR2 260 having the sloped resist region 262. During the first RIE etching operation, the first patterned sacrificial layer 242 functions as an etch stop layer that protects the underlying NFT 220 and the lower cladding layer 210 from the RIE etching.

As indicated above, the profile (e.g., the thickness 257 and the slope angle θ 259) of the slopped cladding region 254 is controlled at least in part by the profile (e.g., thickness and contour of the sloped resist region 262) of the PR2 260. Also as indicated above, the profile of the PR2 is controlled by a reflow process in which the photoresist having a relatively sharp-angled edge is baked at an elevated temperature for a specified duration. By varying the temperature and the duration of the reflow process, the thickness 257 of the patterned top cladding layer 252 can be controlled between about 0.1 to 1 μm, and the slope angle θ 259 of the patterned top cladding layer 252 can be controlled between about 15 to 90 degrees.

Figure 2F:
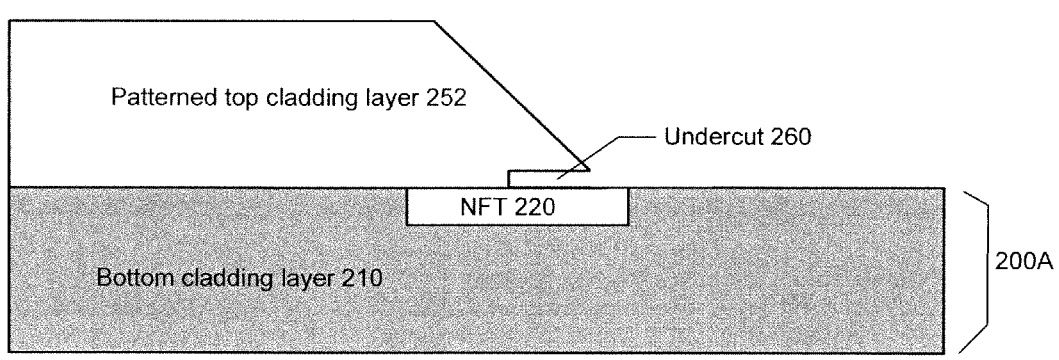

FIG. 2F is a diagram illustrating a step for forming an intermediate structure 200F arrived after removing the first patterned sacrificial layer 244 from the structure 200E (FIG. 2E). This step includes but is not limited to performing a metal etching operation on the first patterned sacrificial layer 244. The metal etching operation can include an RIE operation or a wet etching operation suitable for the particular metal (e.g., Cr) used to form the first patterned sacrificial layer 244. The removal of the first patterned sacrificial layer 242 creates an undercut 260 in a distal end of the patterned top cladding layer 252 as shown in FIG. 2F. In certain embodiments, the undercut 260 is refilled with a refilling dielectric material by steps illustrated in FIGS. 2G-H and described below.

Figure 2G:
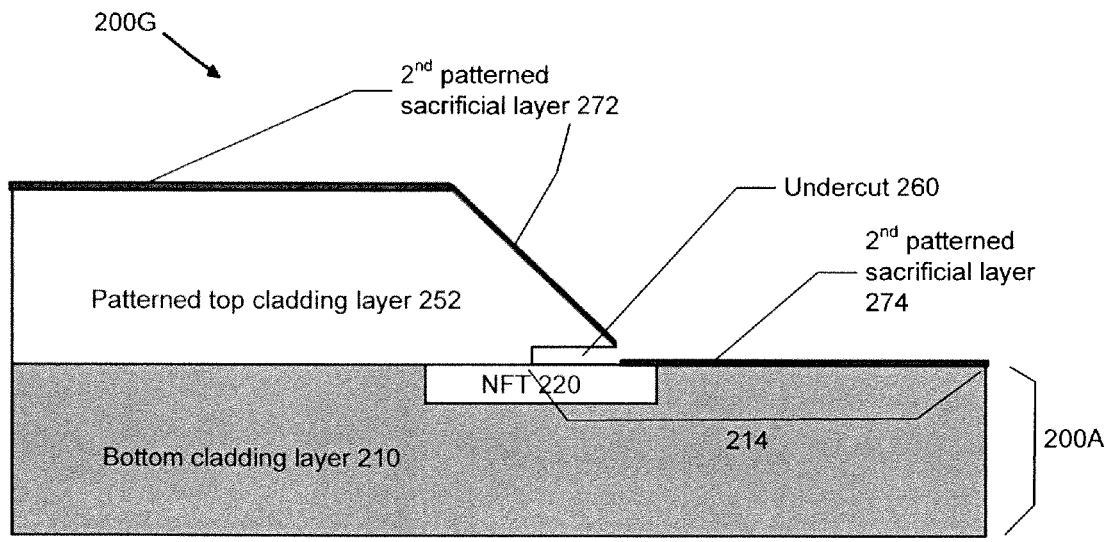

FIG. 2G is a diagram illustrating a step for forming an intermediate structure 200G having a set of second patterned sacrificial layers 272, 274 deposited on the patterned top cladding layer 252 and the second region 214 of the structure 200A, respectively. This step includes but is not limited to depositing a thin sacrificial material to a thickness in the range of about 1 and 5 nm by an ion beam deposition (IBD) process, for example. The sacrificial material is selected so that it can function as an etch stop layer for a second RIE etching operation to be described below with respect to FIG. 2I. In certain embodiments, the sacrificial material includes a metal selected from the group consisting of Cr, NeFe, and Ru.

Figure 2H:
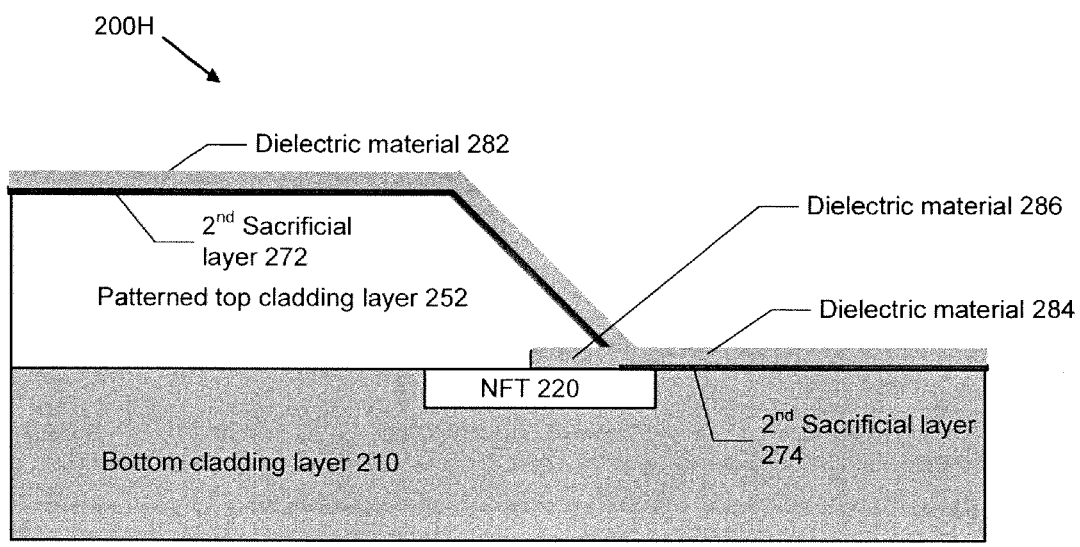

FIG. 2H is a diagram illustrating a step for forming an intermediate structure 200H having a set of dielectric layers 282, 284, 286 deposited over and in the structure 200G (FIG. 2G). This step includes but is not limited to depositing a refilling dielectric material to a thickness in the range of about 10 and 40 nm by an atomic layer deposition (ALD) process, for example. The refilling dielectric material is preferably the same dielectric material comprising the patterned top cladding layer 252. During the ALD deposition process, the undercut 260 (FIG. 2F), formed in the patterned top cladding layer 252 by the removal of the first patterned sacrificial layer 244, is refilled with the refilling dielectric material.

Figure 2I:
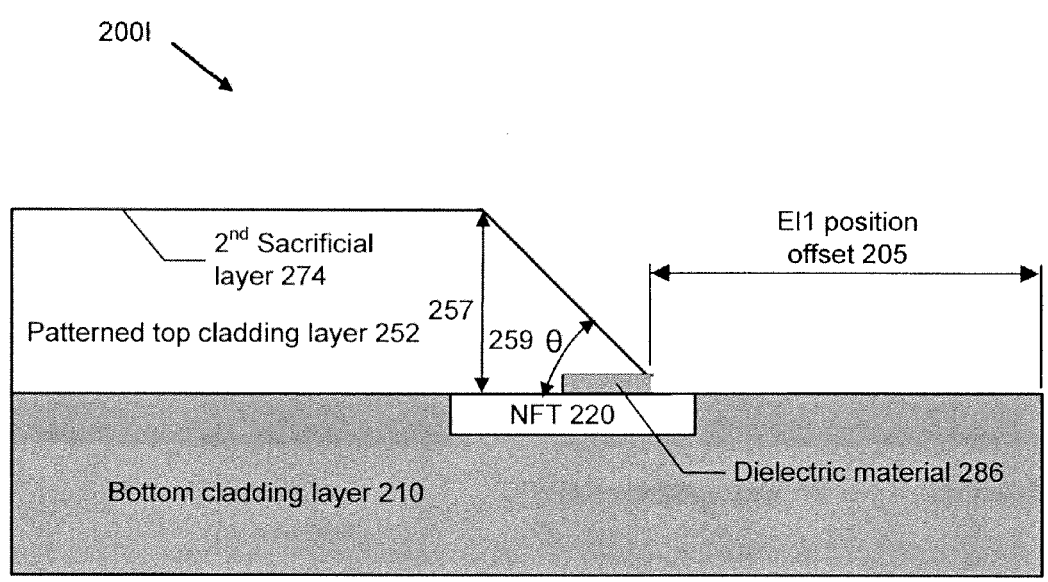

FIG. 2I is a diagram illustrating a step for forming a final NFT structure 200I including the patterned top cladding layer 252 with undercut 260 refilled with the refilling dielectric material 286. This step includes but is not limited to removing the refilling dielectric material 282, 284 that are not used for refilling the undercut 260. The removal can be achieved, for example, by an RIE operation suitable for the particular refilling dielectric material (e.g., AlOx) used. The final NFT structure 200I includes the sloped region 254 having the thickness 257, the slope angle θ 259, and a slope pole position offset 205. During the RIE etching operation, the second sacrificial layer 272, 274 functions as an etch stop layer. At least a portion of the second sacrificial layer 272, 274 can be removed during the RIE etching operation ("over etch"). The amount of the over etch can determine the slope pole position offset 205 shown in FIG. 2I. The remaining portion of the second sacrificial layer 272, 274 can be subsequently removed by a wet etching operation, for example.

Figure 3:
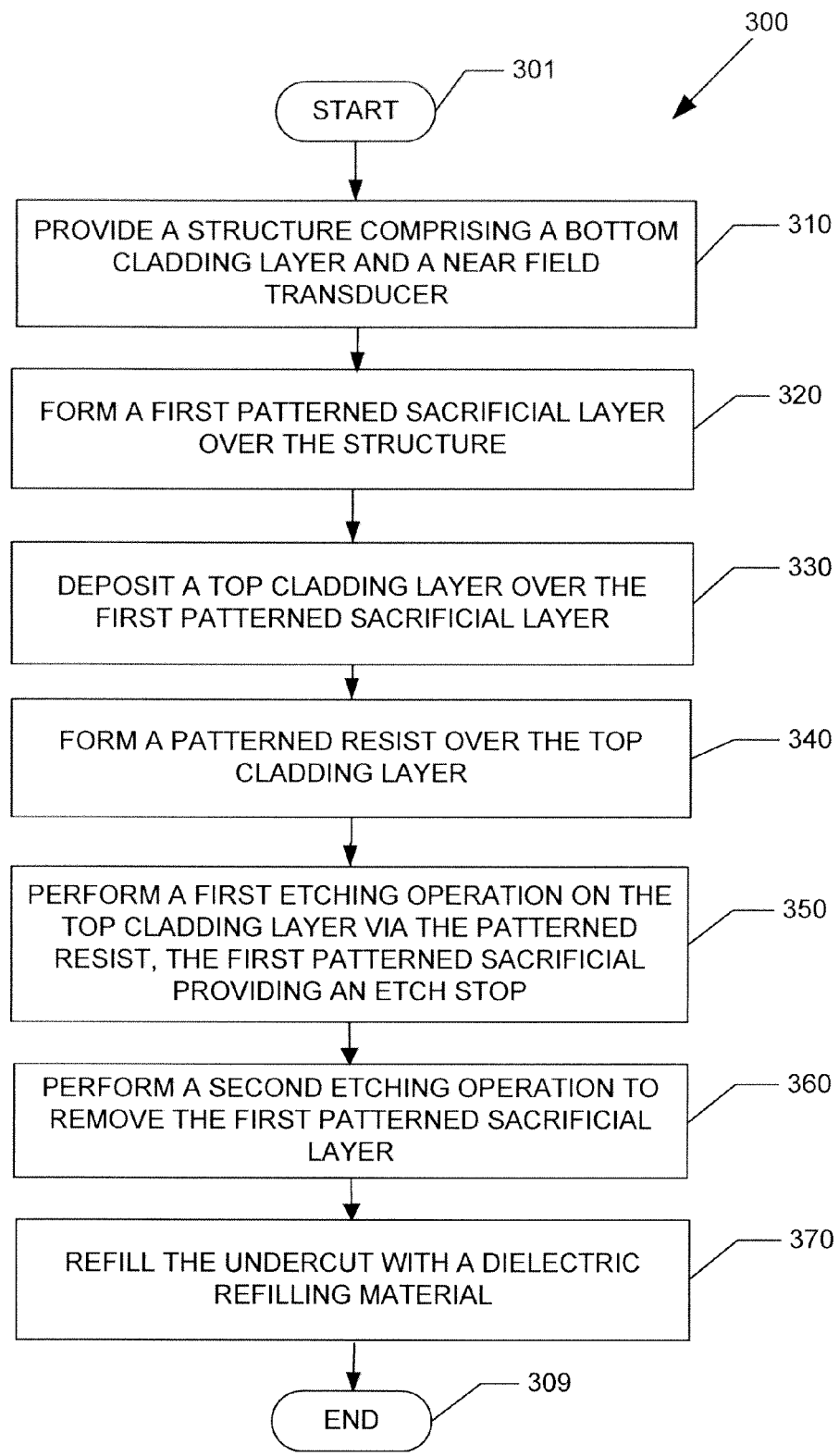
FIG. 3 is a flowchart illustrating an exemplary process for producing an NFT structure having a dielectric slope according to certain aspects of the subject disclosure.

FIG. 3 is a flowchart illustrating an exemplary process 300 for fabricating an NFT structure having a dielectric slope according to certain aspects of the subject disclosure. For the sake of clarity only without the intention to limit the scope of the subject disclosure in any way, the process 300 will be described below with references to FIGS. 2A-I. The process 300 begins at start state 301 and proceeds to operation 310 in which the structure 200A (FIG. 2A) comprising the bottom cladding layer 210 and the NFT 220 is provided. The bottom cladding layer 210 can be a dielectric material selected from the group consisting of aluminum oxide (AlOx), silicon dioxide ($SiO_2$), gallium nitride (GaN), and silicon oxi-nitride (SiON). The NFT 220 can be any metal that can support surface plasmon resonance (SPR) including but limited to Au, Ag, Al and a combination thereof.

The process 300 proceeds to operation 320 in which the set of first patterned sacrificial layers 242, 244 are formed over the structure 200A to obtain the intermediate structure 200B of FIG. 2B. The operation 320 can include forming the first patterned photoresist (PR1) 230 on the first region 212 of the structure 200A by a known photolithography process and depositing the set of first patterned sacrificial layers 242, 244 on the PR1 230 and the second region 214 of the structure 200A, respectively. The sacrificial material can be a metal selected from the group consisting of Cr, NeFe, and Ru. The metal sacrificial material is deposited using a known metal deposition process such as sputter deposition. The PR1 230 and the first patterned sacrificial layer 242 formed thereon are removed by a lift-off process.

The process 300 proceeds to operation 330 in which the top cladding layer 250 is deposited over the first region of the structure 200A and the first patterned sacrificial layer 244 as shown in FIG. 2C. In certain embodiments, the dielectric material comprising the top cladding layer 250 is the same as the dielectric material comprising the bottom cladding layer 210 such as aluminum oxide (AlOx), silicon dioxide ($SiO_2$), gallium nitride (GaN), and silicon oxi-nitride (SiON). In other embodiments, the dielectric material comprising the top cladding layer is different from the dielectric material comprising the bottom cladding layer. The dielectric material comprising the top cladding layer 250 is typically deposited using sputter deposition process, although any other suitable deposition process such as ion beam deposition and chemical vapor deposition may be used.

The process 300 proceeds to operation 340 in which the second patterned photoresist (PR2) 260 is formed over the top cladding layer 250 to arrive at the intermediate structure 200D of FIG. 2D. As described above with respect to FIG. 2D, the operation 340 involves depositing a photoresist layer over the top cladding layer 250; patterning the photoresist layer to obtain a patterned photoresist having a relatively sharp edge; and reflowing (e.g., baking) the patterned photoresist at an elevated temperature (e.g., slightly below the glass transition temperature of the photoresist material) for a specific duration to form the sloped resist region 262 of the second patterned photoresist (PR2) 260.

The process 300 proceeds to operation 350 in which a first etching operation is performed on the top cladding layer 250 via the PR2 260 to form the patterned top cladding layer 252 that includes the sloped region 254 having the thickness 257 and the slope angle θ 259. The operation 350 includes performing a first RIE etching operation on the top cladding layer 250 via the PR2 260 having the sloped resist region 262. During the first RIE etching operation, the first patterned sacrificial layer 242 functions as an etch stop layer that protects the underlying NFT 220 and the lower cladding layer 210 from the RIE etching.

The process 300 proceeds to operation 360 in which a second etching operation is performed to remove the first patterned sacrificial layer 242 as shown in FIG. 2F. The operation 360 can include performing a metal etching operation. As described above with respect to FIG. 2F, the metal etching operation can include an RIE operation or a wet etching operation such as Cr RIE or CR wet etching operation. The removal of the first patterned sacrificial layer 242 leaves behind the undercut 260 in a distal end of the patterned top cladding layer 252 as shown in FIG. 2F.

The process 300 proceeds to operation 370 in which the undercut 260 is refilled with a refilling dielectric material by steps described above with to respect to FIGS. 2G-I which are not repeated here for the sake of brevity.

Figure 4A:
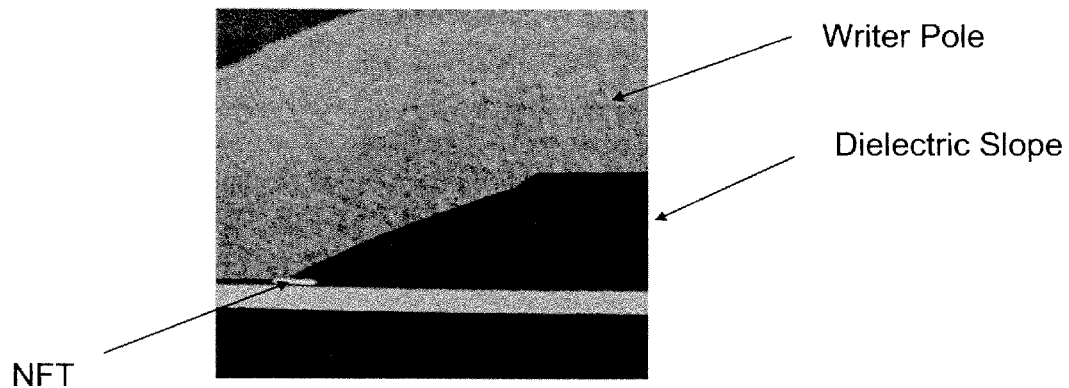
FIGS. 4A and 4B are focused ion beam cross section images of NFT structures with dielectric slopes formed by one or more of fabrication methods of the present disclosure.
Figure 4B:
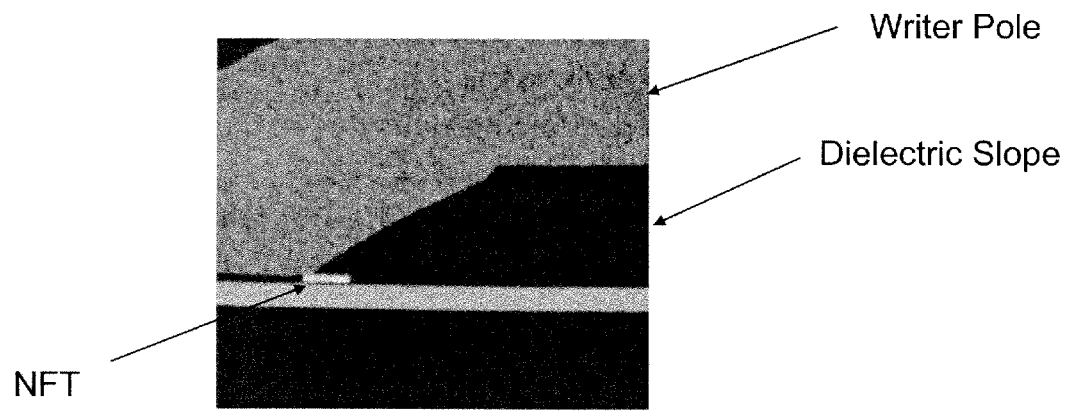

FIGS. 4A and 4B are focused ion beam cross section images of NFT structures with dielectric slopes formed by fabrication methods described above. The images demonstrate that the profile (e.g., the thickness and the slope angle) of dielectric slope may be controllably varied by the methods described herein while maintaining a specific slope pole position offset (80 nm in the experimental embodiments). The EL1 position offset is determined mainly from the etching operation (e.g., AlOx RIE etching) performed to remove residual refilling dielectric materials 282, 284 described above with respect to FIG. 2I. The slope pole position offset can be controlled accurately by the end point provided by the second sacrificial layer 272. The 80 nm slope pole position offset in the experimental embodiments of FIGS. 4A and 4B were achieved with a 10% over etch. Different resist reflow processes (e.g., different baking temperature and duration) can affect the profile of the dielectric slope, but not the slope pole position offset.

Various dielectric slope fabrication methods described herein provide distinct advantages over prior art methods. The advantages include but are not limited to: 1) no residue or any contamination left behind; 2) the slope angle being tunable, e.g., from 25 to 50 degrees, to meet design requirements; 3) achieving superior WIW and WTW sigmas; 4) easy integration with other components of EAMR head such as mode converter and NFT heat sink; and 5) adaptability of the approach to fabrication of a single writer which requires a VP3 pole angle of greater than 35 degrees.

The description of the invention is provided to enable any person skilled in the art to practice the various embodiments described herein. While the present invention has been particularly described with reference to the various figures and embodiments, it should be understood that these are for illustration purposes only and should not be taken as limiting the scope of the invention.

There may be many other ways to implement the invention. Various functions and elements described herein may be partitioned differently from those shown without departing from the spirit and scope of the invention. Various modifications to these embodiments will be readily apparent to those skilled in the art, and generic principles defined herein may be applied to other embodiments. Thus, many changes and modifications may be made to the invention, by one having ordinary skill in the art, without departing from the spirit and scope of the invention.

A reference to an element in the singular is not intended to mean "one and only one" unless specifically stated, but rather "one or more." The term "some" refers to one or more. Underlined and/or italicized headings and subheadings are used for convenience only, do not limit the invention, and are not referred to in connection with the interpretation of the description of the invention. All structural and functional equivalents to the elements of the various embodiments of the invention described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

We claim:

1. A method of forming an energy assisted magnetic recording (EAMR) writer, the method comprising:
   providing a structure comprising a bottom cladding layer and a near field transducer (NFT);
   forming a patterned sacrificial layer over the structure;
   depositing a top cladding layer over the patterned sacrificial layer and a remaining region of the structure not covered by the patterned sacrificial layer;
   forming a patterned resist over the top cladding layer; and
   performing a first etching operation on the top cladding layer via the patterned resist,
   whereby a top cladding having a sloped region is formed,
   wherein the patterned sacrificial layer provides an etch stop for the first etching operation; and
   wherein the NFT is disposed in a groove formed in the bottom cladding layer, wherein a to surface of the NFT is coplanar with a top surface of the bottom cladding layer.

2. The method of claim 1, wherein the bottom cladding layer comprises a dielectric material selected from the group consisting of aluminum oxide (AlOx), silicon dioxide (SiO2), gallium nitride (GaN), and silicon oxi-nitride (SiON).

3. The method of claim 2, wherein the top cladding layer comprises a dielectric material comprising the dielectric layer.

4. The method of claim 1, wherein the patterned sacrificial layer comprises a metal selected from the group consisting of Cr, NiFe, and Ru.

5. The method of claim 1, wherein the first etching operation comprises a reactive ion etching (RIE) operation.

6. The method of claim 1 further comprising performing a second etching operation to remove the patterned sacrificial layer.

7. A method of forming an energy assisted magnetic recording (EAMR) writer, the method comprising:
- providing a structure comprising a bottom cladding layer and a near field transducer (NFT);
- forming a patterned sacrificial layer over the structure;
- depositing a top cladding layer over the patterned sacrificial layer and a remaining region of the structure not covered by the patterned sacrificial layer;
- forming a patterned resist over the top cladding layer; and
- performing a first etching operation on the to cladding layer via the patterned resist
- whereby a top cladding having a sloped region is formed, wherein the patterned sacrificial layer provides an etch stop for the first etching operation; and
- wherein the step of forming the patterned resist comprises forming a photoresist and reflowing the photoresist at an elevated temperature to form a sloped resist region in the photoresist.

8. The method of claim 7, wherein the elevated temperature is below a glass transition temperature of the photoresist.

9. The method of claim 7, wherein a profile of the sloped region of the top cladding is controlled by a profile of the sloped resist region of the photoresist.

10. The method of claim 7, wherein:
- the profile of the sloped resist region comprises one or both of a thickness of the sloped resist region and a contour of the sloped resist region; and
- the profile of the sloped region comprises one or both of a thickness of the sloped region and an angle that a sloped side of the sloped region makes with the bottom cladding layer.

11. The method of claim 10, wherein the angle can be controlled between about 15 to 90 degrees.

12. The method of claim 10, wherein the thickness of the top cladding can be controlled between about 0.1 to 1 μm.

13. The method of claim 10, wherein the thickness of the sloped cladding region is about 0.7 μm, and the angle is between about 30 and 45 degrees.

14. A method of forming an energy assisted magnetic recording (EAMR) writer, the method comprising:
- providing a structure comprising a bottom cladding layer and a near field transducer (NFT);
- forming a patterned sacrificial layer over the structure;
- depositing a top cladding layer over the patterned sacrificial layer and a remaining region of the structure not covered by the patterned sacrificial layer;
- forming a patterned resist over the top cladding layer;
- performing a first etching operation on the to cladding layer via the patterned resist, and
- performing a second etching operation to remove the patterned sacrificial layer;
- whereby a top cladding having a sloped region is formed, wherein the patterned sacrificial layer provides an etch stop for the first etching operation; and wherein:
- the patterned sacrificial layer comprises a proximate portion disposed proximate to an air bearing surface (ABS) of the EAMR writer and a distal portion opposite to the proximate portion;
- the distal portion is disposed below the sloped cladding region of the top cladding after completion of the first etching operation; and
- the second etching operation removes the distal portion of the patterned sacrificial layer as well as a remainder of the patterned sacrificial layer, whereby an undercut is formed in the sloped cladding region.

15. The method of claim 14 further comprising performing a deposition operation to refill the undercut with a refilling material, the refilling material comprising a dielectric material comprising the top cladding layer.

16. The method of claim 15, wherein the deposition operation comprises an atomic layer deposition (ALD) operation.

17. The method of claim 15, wherein, before the deposition operation is performed, a second sacrificial layer is deposited on the top cladding and a region of the bottom cladding layer not covered by the top cladding.

18. The method of claim 17, wherein the second sacrificial layer comprises a material selected from the group consisting of Cr, NiFe, and Ru.

19. The method of claim 17 further comprising performing a third etching operation to remove the refilling material deposited on the top cladding layer and on the region of the bottom cladding layer not covered by the top cladding, the second sacrificial layer providing a second etch stop for the third etching operation.

* * * * *